June 12, 1956

J. FLEMING 2,749,856

FERTILIZER DISTRIBUTING APPARATUS
FOR CHECK-ROW CORN PLANTERS

Filed Oct. 8, 1952

Joseph Fleming
INVENTOR.

BY *Clarence A. O'Brien*
*and Harvey B. Jacobson*
Attorneys

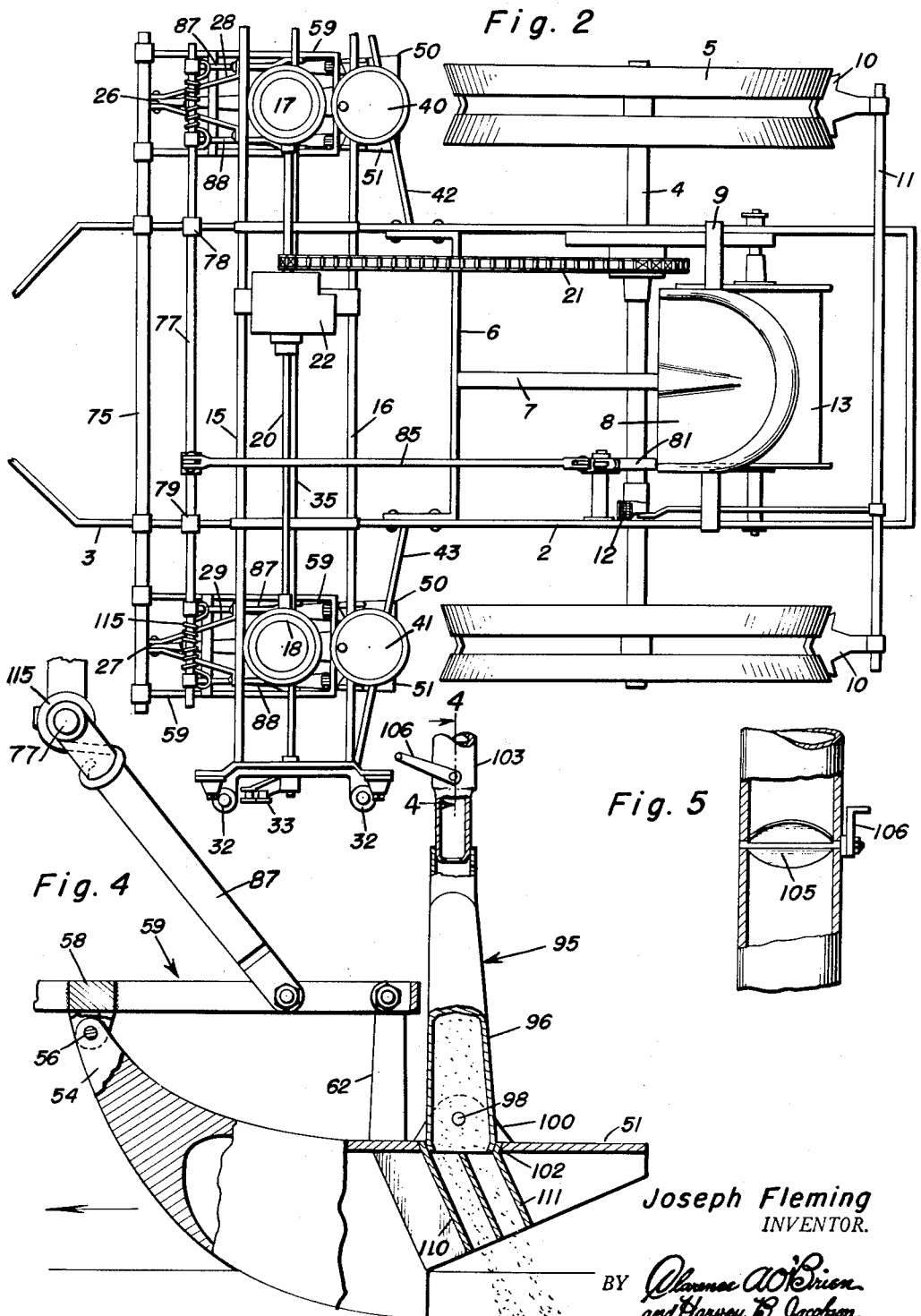

United States Patent Office 2,749,856
Patented June 12, 1956

2,749,856

FERTILIZER DISTRIBUTING APPARATUS FOR CHECK-ROW CORN PLANTERS

Joseph Fleming, Shullsburg, Wis.

Application October 8, 1952, Serial No. 313,687

1 Claim. (Cl. 111—52)

My invention relates to improvements in fertilizer distributing apparatus for attachment to check-row corn planters.

The primary object of the invention is to provide an efficient fertilizer distributing apparatus for attachment to a two-row corn planter of the check-row type and which is operative under control of the check-row mechanism of the planter to distribute fertilizer at opposite sides of the rows of seed being planted, each time the seed is dropped into the furrows.

Another object is to provide apparatus for the above purpose equipped for distributing the fertilizer at selected depths in the ground and scattering the fertilizer so that the same will not be too thickly deposited.

Still another object is to provide an apparatus for accomplishing the above which is attachable to corn planters of commerce without altering the basic construction of the corn planter.

Still another object is to provide a fertilizer distributing attachment for such corn planters, which is inexpensive to manufacture, attach and use.

Other and subordinate objects, within the purview of my invention, together with the precise nature of my improvements will be readily understood when the succeeding description and claim are read with reference to the drawings accompanying and forming part of the specification.

In said drawings:

Figure 2 is a view in plan;

Figure 4 is a view in vertical longitudinal section taken on the line 4—4 of Figure 3; and Figure 5 is a fragmentary view partly in vertical section and partly in side elevation taken on the line 5—5 of Figure 4 and drawn to a larger scale.

Figure 1:
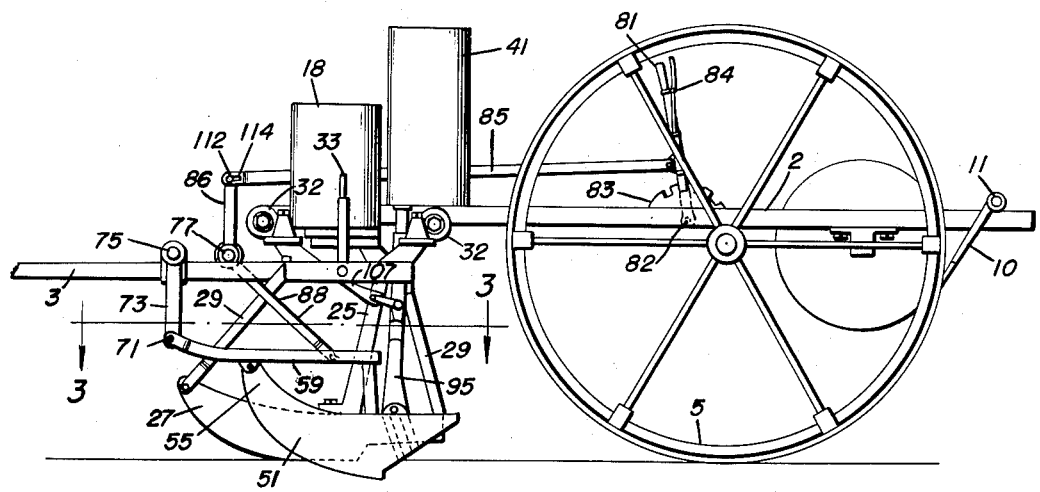
Figure 1 is a view in side elevation of a check-row corn planter embodying my apparatus, in the preferred embodiment thereof with parts omitted.
Figure 3:
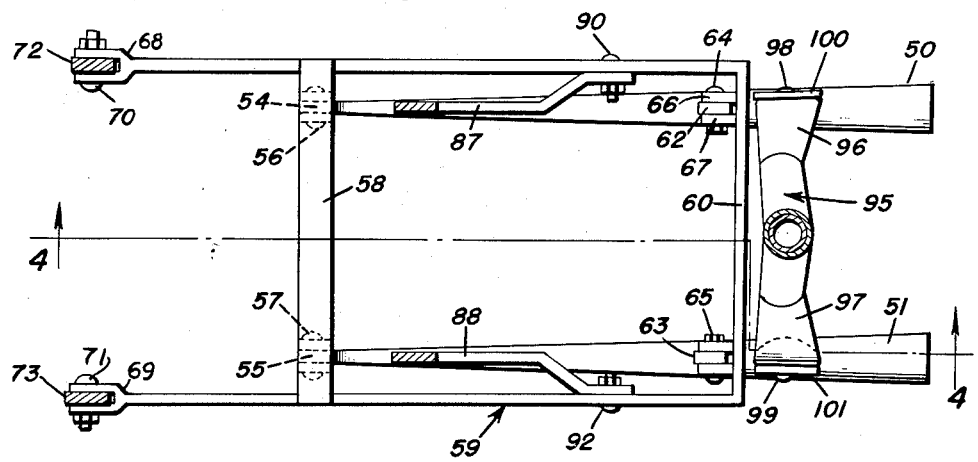
Figure 3 is a fragmentary view in horizontal section taken on the line 3—3 of Figure 1 and drawn to a larger scale with parts omitted for clearness of illustration.

Referring to the drawings by numerals, my invention has been illustrated therein as embodied in a two-row check-corn planter of the type comprising a rear frame 2 and a front frame 3 suitably connected to the rear frame 2. An axle 4 with a pair of ground wheels 5 thereon supports the rear frame 2. A cross bar 6 on the rear frame 2 supports a seat post 7 with the operator's seat thereon and which is braced by supports 9. Wheel scrapers 10 on a rock shaft 11 on the rear frame 2 are operated by a pedal 12 on said shaft 11. A reel 13 for the check-row wire (not shown) is carried by the rear frame 2.

The front frame comprises a pair of laterally spaced cross-bars 15, 16 and between which a pair of seed hoppers 17, 18 are suitably mounted at opposite sides of the frames 2 and 3 in the line of travel of the wheels 5 and from which the seed is discharged by seed delivery mechanism operated by a shaft 20 driven by a sprocket and chain drive 21 from the axle 4 through a variable speed transmission 22.

The seed drops from the seed hoppers 17, 18 through the usual boots, one of which is shown at 25, in Figure 1, and into a pair of seed furrow opening runners 26, 27 which are supported at the front ends thereof by pairs of upwardly and rearwardly diverging bars 28, 29 suitably secured to the cross-bar 15. At the rear end thereof, the runners 26, 27 are supported from the cross-bar 16 by bars one of which is shown at 29 in Figure 1.

Check-row mechanism is carried by the front frame 2 including check-row wire rollers 32 at the ends of said bars 15, 16 and wire operated levers, one of which is shown at 33, operating a rock shaft 35 on said frame 3 and which is operatively connected to the transmission 22 and to suitable valves, not shown, in the seed hoppers 17, 18 associated with the seed delivering mechanism, not shown.

A pair of fertilizer hoppers 40, 41 are supported in the rear of the seed hoppers 17, 18 in line with the wheels 5 on bars 42, 43 forming part of the rear frame 2 and so that said hoppers discharge in the rear of the point of planting of the seed.

The corn planter, so far described, is of the general type disclosed in U. S. Patent No. 1,857,749 to C. H. White, to which attention is directed for details thereof.

According to my invention, fertilizer distributing apparatus for the planter is provided comprising the following.

A pair of fertilizer furrow opening and distributing runners 50, 51 is associated with each fertilizer hopper 40, 41 and said runners 50, 51 are arranged in each pair upon opposite sides of the seed furrow opening runners 26, 27 and spaced equidistantly therefrom.

Means is provided for mounting the pairs of fertilizer furrow opening and distributing runners 50, 51 for vertical adjustment to vary the depths of the furrows formed thereby and the depths at which the fertilizer will be distributed in the furrows. Since the mounting means for each of said runners 50, 51 is the same, a description of one of the means will suffice for both.

Each pair of fertilizer furrow opening and distributing runners 50, 51 has the upwardly curved front ends 54, 55 thereof bolted as at 56, 57 to a cross-bar 58 on a U-shaped horizontal runner adjusting yoke 59 having a rear closed end 60 in the rear of the seed hopper boot 25. Riser bars 62, 63 on the tops of said runners 50, 51 are bolted, as at 64, 65 between pairs of lateral ears 66, 67 on said rear end 60 of the yoke 59. Each yoke 59 is provided with bifurcated front ends 68, 69 straddling and being pivoted, as at 70, 71 to a pair of hanger links 72, 73 depending from and fixed to one end of a cross-shaft 75 fixed on the front frame 2, and whereby each yoke 59 is vertically, swingably adjustable to correspondingly adjust the associated pair of fertilizer furrow opening and distributing runners 50, 51.

The yokes 59 are adjustable in unison by means of a transverse rock shaft 77 journaled on the frame 3 in bearings 78, 79. For rocking the rock shaft 77, a hand lever 81 is pivoted, as at 82, on a fixed, toothed detent segment 83 on the rear frame 2 engaged by the usual detent means 84 on said lever, and a pivoted link 85 operatively connecting said lever 84 to an upstanding crank arm 86 on said rock shaft 77. A pair of downwardly and rearwardly extending spaced apart lift arms 87, 88, freely rotatable on the rock shaft 77 at each end thereof, is pivoted, as at 90, 92, to opposite sides of each yoke 59 and to which said shaft 77 is operatively connected as presently described.

Each pair of fertilizer furrow opening and distributing runners 50, 51 is connected to its associated fertilizer hopper 40, 41 by means of an upstanding fertilizer feed boot 95 which is bifurcated and has its furcations 96, 97 pivoted as at 98, 99 to an upstanding ear 100, 101 on top of said runners 50, 51 in communication with a drop opening 102 in the top of each of said runners. The upper end of each boot 95 is slidably sleeved over a discharge pipe 103 on the bottom of the associated fertilizer hopper 17 or 18, as the case may be. Each discharge pipe 103 is provided with a control valve 105 therein, of the butterfly type, having an opening crank 106 thereon.

Operating connections 107 are provided between the shaft 35 of the check-row mechanism and the cranks 106 whereby the valves 105 are opened to discharge fertilizer from the pipes 103 into the boots 95 each time seed is fed out of the seed hoppers 17, 18. A pair of rearwardly and downwardly inclined chutes 110, 111 in each of the fertilizer furrow opening and distributing runners 50, 51 spaced longitudinally of said runners provide for distributing the fertilizer from the boots 95 into said runners and into the furrows formed by said runners at opposite sides of the planted seed and for scattering the fertilizer so that it will not be too thickly deposited.

A slot and pin connection 112, 114 is provided between the link 85 and the crank arm 86, and coil springs 115 are suitably fixed at the centers thereof on the shaft 77 with ends bearing downwardly against the lift arms 87, 88 and are looped around the same as shown in Figure 4, the arrangement being such that the coil springs operatively connect the shaft 77 to said lift arms 87, 88 to lift said arms upon rocking of the shaft 77 counterclockwise as viewed in Figure 4 and provide for lowering of said arms and yieldingly holding the fertilizer furrow opening and distributing runners 50, 51 against the bottoms of the furrows formed thereby when said shaft 77 is rocked clockwise.

As will now be seen, the yokes 59 may be vertically adjusted by operation of the hand lever 81 into different set positions, to correspondingly adjust the fertilizer furrow opening and distributing runners 50, 51 for varying the depth at which the fertilizer will be deposited in the furrows formed by said runners 50, 51 at opposite sides of the planted seed, and the sliding connection between the boots 95 and pipes 103 together with the pivotal connections 98 between said boots 95 and said runners 50, 51 will compensate for vertical adjustment of said runners and boots about the pivots 71, 72 of said runners 50, 51. The fertilizer will be scattered so that it will not be deposited too thickly for proper germination of the seed.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claim.

Having described the invention, what is claimed as new is:

In a planter having a mobile frame and a fertilizer hopper on said frame, and a pair of laterally spaced furrow opening and fertilizer distributing runners, a horizontal yoke having opposite sides carrying said runners in suspended position and spacing the same apart, a rock shaft on said frame, a pair of arms depending from and freely swingable vertically on said shaft and pivoted to opposite sides of said yoke, and a coil spring coiled around and fixed at its center to said shaft with ends looped around said arms and operatively connecting said shaft to said arms to swing said arms vertically in unison in opposite directions upon rocking of said shaft in opposite directions whereby to swing said yoke in opposite directions to raise and lower said runners out of and into furrow opening positions, said spring bearing downwardly on said arms to yieldingly maintain said runners in furrows.

References Cited in the file of this patent
UNITED STATES PATENTS

| | | |
|---|---|---|
| 266,656 | Stoddard et al. | Oct. 31, 1882 |
| 556,671 | Griffith | Mar. 17, 1896 |
| 594,669 | Williams | Nov. 30, 1897 |
| 718,640 | Lathrop | Jan. 20, 1903 |
| 958,772 | Rogers et al. | May 24, 1910 |
| 1,668,391 | Bailey | May 1, 1928 |
| 1,857,749 | White | May 10, 1932 |
| 1,921,885 | Kriegbaum et al. | Aug. 8, 1933 |
| 2,030,567 | Bowen | Feb. 11, 1936 |
| 2,318,224 | Hyland | May 4, 1943 |

FOREIGN PATENTS

| | | |
|---|---|---|
| 573,796 | France | Mar. 17, 1924 |